(12) United States Patent
Golding et al.

(10) Patent No.: US 8,666,860 B2
(45) Date of Patent: Mar. 4, 2014

(54) METHOD AND SYSTEM FOR CURRENCY EXCHANGE BY POINT OF CONVERSION

(75) Inventors: John Golding, Highland, UT (US); Joshua Trent, Holladay, UT (US)

(73) Assignee: International Monetary Specialists, Salt Lake City, UT (US)

(*) Notice: Subject to any disclaimer, the term of this patent is extended or adjusted under 35 U.S.C. 154(b) by 218 days.

(21) Appl. No.: 13/176,576

(22) Filed: Jul. 5, 2011

(65) Prior Publication Data

US 2012/0011048 A1 Jan. 12, 2012

Related U.S. Application Data

(60) Provisional application No. 61/361,666, filed on Jul. 6, 2010.

(51) Int. Cl.
*G06Q 40/00* (2012.01)
*G06Q 40/04* (2012.01)

(52) U.S. Cl.
CPC .................................... *G06Q 40/04* (2013.01)
USPC ................... 705/35; 705/18; 705/37; 705/42; 705/43

(58) Field of Classification Search
USPC .................... 705/35, 18, 37, 42–43
See application file for complete search history.

(56) References Cited

U.S. PATENT DOCUMENTS

| | | | | |
|---|---|---|---|---|
| 6,199,046 | B1 * | 3/2001 | Heinzle et al. | 705/39 |
| 6,721,715 | B2 * | 4/2004 | Nemzow | 705/35 |
| 7,219,832 | B2 * | 5/2007 | Fillinger et al. | 235/379 |
| 7,328,188 | B1 * | 2/2008 | Barry | 705/40 |
| 7,660,768 | B2 * | 2/2010 | Beck et al. | 705/44 |
| 8,364,584 | B2 * | 1/2013 | Nicholls et al. | 705/39 |
| 8,412,603 | B2 * | 4/2013 | N et al. | 705/35 |
| 2008/0147569 | A1 * | 6/2008 | Kahan et al. | 705/36 R |
| 2008/0249908 | A1 * | 10/2008 | Lorberg et al. | 705/35 |
| 2009/0177579 | A1 * | 7/2009 | Ling | 705/39 |

OTHER PUBLICATIONS

"Dynamic Currency Conversion." Merchant Professionals. N.p., Jun. 25, 2009. Web. May 2, 2013. <http://web.archive.org/web/20090625194053/http://www.merchantprofessionals.com/dynamic-currency-conversion.cfm>.(3 pages).*

"Dynamic Currency Conversion, a First Data Service". Cybersource. <www.cybersource.com>. 2007, (2 pages).*

* cited by examiner

*Primary Examiner* — Elda Milef
(74) *Attorney, Agent, or Firm* — Greenberg Traurig, LLP

(57) ABSTRACT

In one embodiment, one use of the disclosed method/system is for any multinational entity or individual performing currency exchanges is for business or personal use. This embodiment will greatly enhance the Transparency of the Cash Conversion Process at the ACTUAL POINT OF CONVERSION (POC), revealing dealt and offset pricings and TIME thereof thus providing the customer with a complete report of conversion as with any commodity conversion. With the POC method, the client will have a substantially complete accounting of the value of the funds conversion from one region's currency to another.

7 Claims, 15 Drawing Sheets

Beneficiary Payment History

Your Dashboard » Beneficiaries » Beneficiary Payment History

Account ID:

To find details for a specific beneficiary, select a beneficiary from the dropdown list or enter their payment identifier in the appropriate field. When you are ready to execute your search, click on the Search Button. Clicking on the hotlink in the number of payments will display the payment history.

Beneficiary: Show payments for all beneficiaries
Identifier:
Payment From Date:   Payment To Date:   Method Of Payment: <All>

Payment Instructions:

| Identifier | Beneficiary | # of Payments | Last Payment Date | Method Of Payment |
|---|---|---|---|---|
| DAV294 | | 1 | 2008/11/03 | Wire |
| DAV294 | | 1 | 2005/08/30 | Wire |
| DEB661 | | 2 | 2003/11/12 | Wire |
| DEB201 | | 4 | 2011/05/16 | Wire |
| FOR641 | | 1 | 2006/05/12 | Wire |
| FOR788 | | 1 | 2005/07/25 | |
| FOR010-1 | | 3 | 2011/05/16 | Wire |
| FOR052 | | 3 | 2006/04/28 | Wire |

You are viewing record(s) 1 to 10   Page 1 of 4   10 items per page   Total Record(s) = 34

Spot Deal Confirmation

Your Account #:
Tel:
Email:

"offset booking rate"
(9/26/11 spec. p. 3)

| Contract Details | | | | | |
|---|---|---|---|---|---|
| Deal Number: | 1616237 | | | | |
| Deal Submission: | ezTrade | | | "customer dealt rate" | |
| Date Booked: | 21 Jun 2011 at 4:22:01 PM EST | | | (9/26/11 spec. p. 9) | |
| Cost | | Booking Rate | Delivery Rate | | Purchased |
| USD | 143.23 | 1.404200 / 0.712149 | 1.432300 / 0.698178 | EUR | 100.00 |
| USD | 2.81 | FX Delivery Cost (Included in Total Cost) | "market cost" | | |
| | ∅ | Service Charges | (9/26/11 spec. p. 3) | | |
| USD | 143.23 | Total Cost | | | |

| Settlement Details | | | | | |
|---|---|---|---|---|---|
| The settlement amount(s) of USD 143.23 will be paid to | | | as follows: | | |
| USD | 143.23 | Awaiting settlement funds | | | |

| Payment Details | | | | | |
|---|---|---|---|---|---|
| You have applied and instructed | | | make the following payments | | |
| Cost | | Service Charges | Method Of Payment | Details | Payment Amount |
| USD | 143.23 | | | Awaiting payment instructions | EUR 100.00 |
| USD | 143.23 | ∅ | | TOTALS | EUR 100.00 |

METHOD AND SYSTEM FOR CURRENCY EXCHANGE BY POINT OF CONVERSION

This application contains material that is subject to copyright protection. Such material may be reproduced by any person exactly as it appears in the Patent and Trademark Office patent files or records. The copyright owner otherwise reserves all rights to such material.

A further embodiment functions within the system of the interbank market. This market does not have a central exchange and the currencies of most developed countries have floating exchange rates causing currency values to fluctuate relative to other currencies; primarily banks and other market makers dictate the values.

One embodiment provides entities/individuals with the ability to see into the non-transparent interbank market allowing for opportunity to increase exchange efficiency, decrease cost of exchange and provide accurate disclosure of cost by identifying the difference between the customer dealt rate of the exchange and the rate in which the accommodating Primary Market actually offsets for that delivery. In other words, this embodiment shows the added Value to the Primary Market Maker, and thus revealing the market cost and/or Fee to the one taking delivery.

A further embodiment was developed for the use of multinational companies exchanging foreign currency; the system can also be for the use of private individuals. A still further embodiment provides transparency of values and cost to a customer performing currency exchange through the issuing of a point of conversion ("POC") report with each transaction. This POC report contains the pertinent information to allow a customer the ability to substantiate the cost of their exchange. The POC report shows the offset rate and customer dealt rate and may also show at least one of the following:

Time Stamp: the date and time the trade was executed
  Deal Date: the date the exchange was done or trade was executed
  Reference number of Each Individual Trade, as Each Trade is offset individually
  Sell Amount: the amount of currency that is being sold by the customer
  Sell: the currency that is being sold by the customer
  Buy: the currency that is being bought by the customer
  Buy Amount: the amount of currency being bought by the customer
  Offset Booking Rate: The Rate which the Primary Market Maker can book to offset trade
  Market Cost (USD): the cost of the conversion to the customer in USD or base currency of customer as required, as the difference from the Primary Market Offset to the total Buy or Sell Rate of the customer.

In one embodiment the customer will not only be issued a POC report for the values and cost of exchange but have the ability to account fully the actual differences of their Commodities of Foreign Currency back to their base domicile currency and accounting for all pertinent values and differences within the market place.

The Point of Conversion Report tracks the pertinent factors to define a gap in the foreign exchange market for a businesses agenda and not the dealing bank.

BRIEF DESCRIPTION OF THE SEVERAL VIEWS OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed invention

Illustrative Operating Environment

Figure 1:
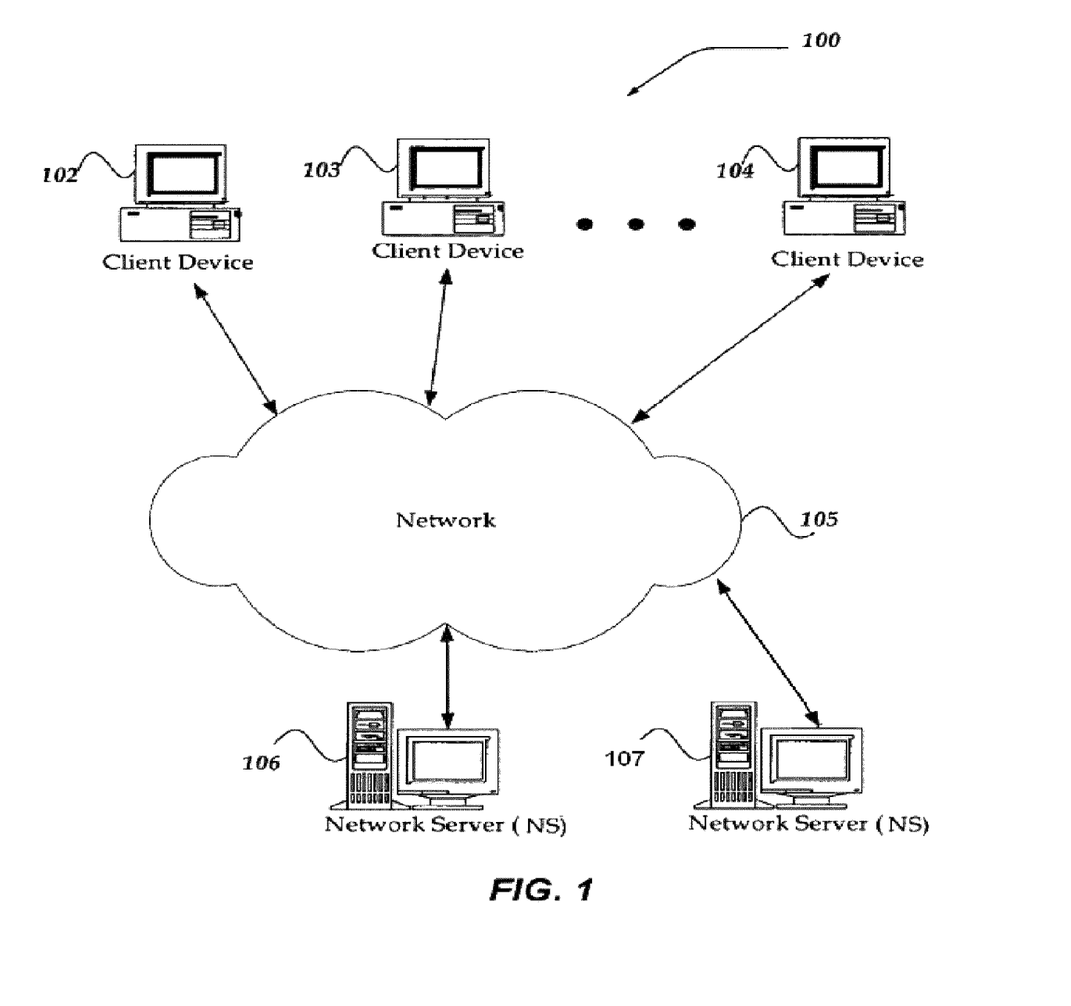
FIG. 1 illustrates one embodiment of an environment in which the present invention may operate.

FIG. 1 illustrates one embodiment of an environment in which the present invention may operate. However, not all of these components may be required to practice the invention, and variations in the arrangement and type of the components may be made without departing from the spirit or scope of the invention. In some embodiments, the point of conversion system hosts a large number of members and concurrent transactions. In other embodiments, the point of conversion system computer is based on a scalable computer and network architecture that incorporates varies strategies for assessing the data, caching, searching, and database connection pooling. An example of the scalable architecture is an architecture that is capable of operating multiple servers.

In embodiments, members of the inventive computer system 102-104 (e.g. user (e.g. players, agents, etc.)) include virtually any computing device capable of receiving and sending a message over a network, such as network 105, to and from another computing device, such as servers 106 and 107, each other, and the like. In embodiments, the set of such devices includes devices that typically connect using a wired communications medium such as personal computers, multiprocessor systems, microprocessor-based or programmable consumer electronics, network PCs, and the like. In embodiments, the set of such devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, in embodiments, customer devices 102-104 are any device that is capable of connecting using a wired or wireless communication medium such as a PDA, POCKET PC, wearable computer, and any other device that is equipped to communicate over a wired and/or wireless communication medium.

In embodiments, each member device within member devices 102-104 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handhe7ld Device Markup Language (HDML), such as Wireless Markup Language (WML), WMLScript, JavaScript, and the like. In embodiments, the invention is programmed in either Java or .Net.

In embodiments, member devices 102-104 may be further configured to receive a message from the another computing device employing another mechanism, including, but not limited to email, Short Message Service (SMS), Multimedia Message Service (MMS), instant messaging (IM), internet relay chat (IRC), mIRC, Jabber, and the like.

In embodiments, network 105 may be configured to couple one computing device to another computing device to enable them to communicate. In embodiments, network 105 may be enabled to employ any form of computer readable media for communicating information from one electronic device to another. Also, in embodiments, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. In embodiments, on an interconnected set of LANs, including those based on differing architectures and protocols, a router may act as a link between LANs, enabling messages to be sent from one to another.

Also, in some embodiments, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, in some embodiments, remote computers and other related electronic devices could be remotely connected to either LANs or WANs via a modem and temporary telephone link. In essence, in some embodiments, network 105 includes any communication method by which information may travel between customer devices 102-104, and servers 106 and 107.

Figure 2:
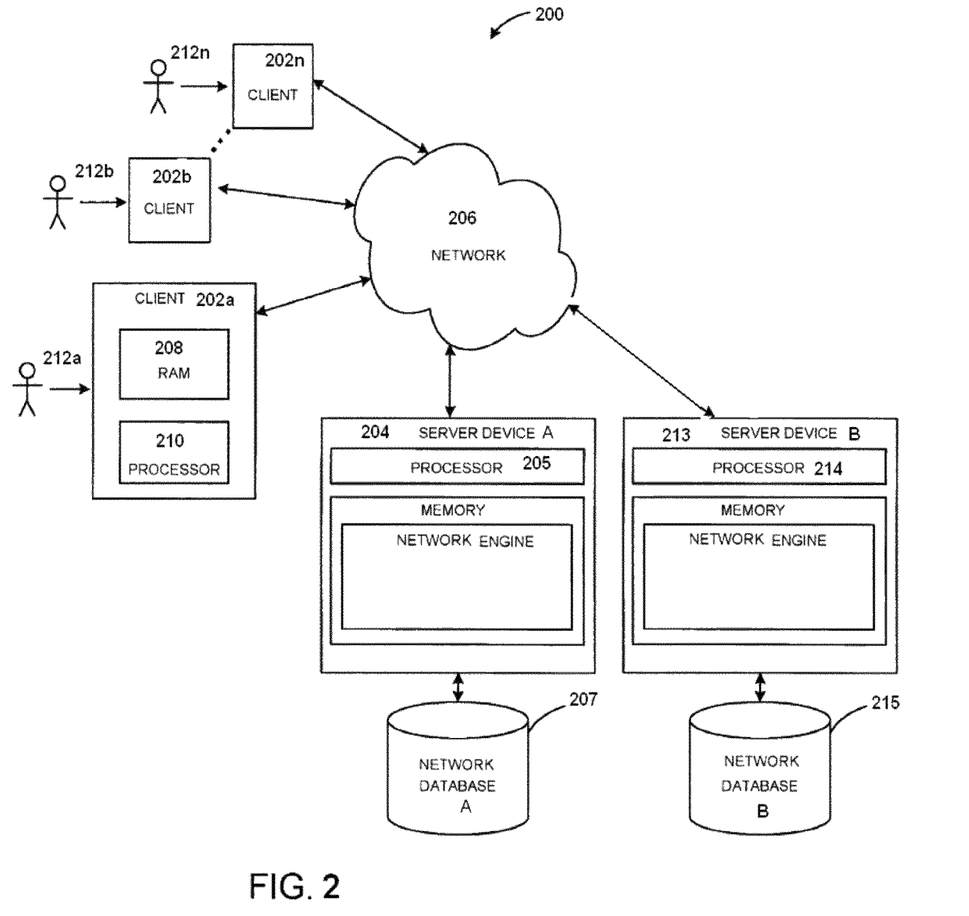
FIG. 2 shows another exemplary embodiment of the computer and network architecture that supports the inventive point of conversion system.

FIG. 2 shows another exemplary embodiment of the computer and network architecture that supports the inventive point of conversion system. The member devices 202a, 202b thru 202n shown (e.g. traders' desktops) each comprises a computer-readable medium, such as a random access memory (RAM) 208 coupled to a processor 210 or FLASH memory. The processor 210 may execute computer-executable program instructions stored in memory 208. Such processors comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media may include, but are not limited to, an electronic, optical, magnetic, or other storage or transmission device capable of providing a processor, such as the processor 210 of customer 202a, with computer-readable instructions. Other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Member devices 202a-n may also comprise a number of external or internal devices such as a mouse, a CD-ROM, DVD, a keyboard, a display, or other input or output devices. Examples of customer devices 202a-n may be personal computers, digital assistants, personal digital assistants, cellular phones, mobile phones, smart phones, pagers, digital tablets, laptop computers, Internet appliances, and other processor-based devices. In general, a customer device 202a are be any type of processor-based platform that is connected to a network 206 and that interacts with one or more application programs. Customer devices 202a-n may operate on any operating system capable of supporting a browser or browser-enabled application, such as Microsoft Windows®, or Linux. The customer devices 202a-n shown may include, for example, personal computers executing a browser application program such as Windows® Internet Explorer, Apple Computer, Inc.'s Safari®, Mozilla Firefox, and Opera.

Through the customer devices 202a-n, users (e.g. players, agents, etc.) 212a-n communicate over the network 206 with each other and with other systems and devices coupled to the network 206. As shown in FIG. 2, server devices 204 and 213 may be also coupled to the network 206.

Figure 3:
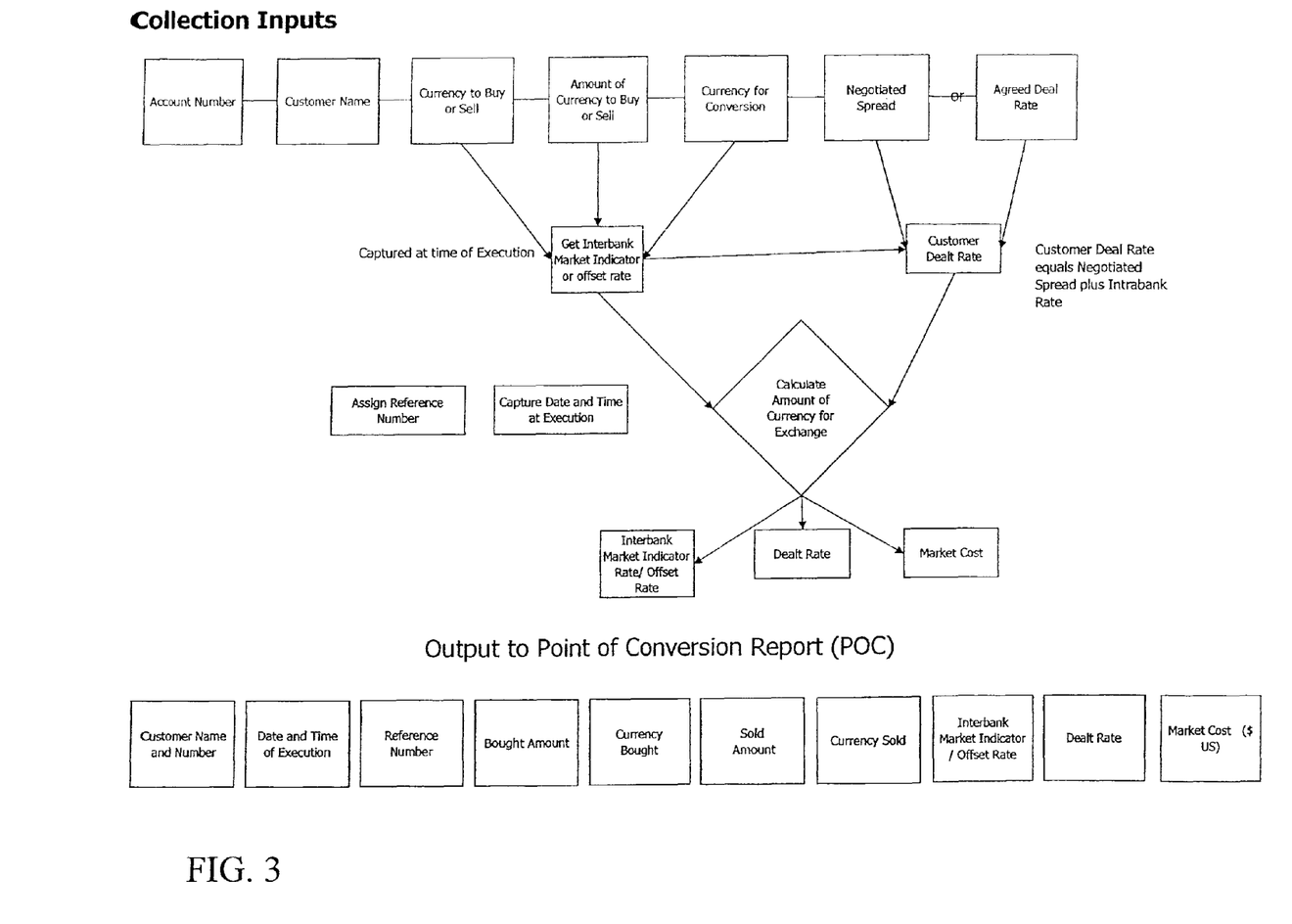
FIG. 3 depicts a flow chart of an embodiment of the point of conversion system that shows an example of compiling a point of conversion analysis.

FIG. 3 depicts a flow chart of an embodiment of the point of conversion system that shows an example of compiling a point of conversion analysis. The following terms will be used in the embodiment shown below.

For purposes of this invention, negotiated spread means the rate that the market maker and customer have agreed to use to calculate the currency conversion and delivery of currency to the customer and includes the agreed deal rate. In one example, the negotiated spread is negotiated on a transaction-by-transaction basis. In another example, the negotiated spread is negotiated for transactions occurring during a certain time period. In a further example, the negotiated spread is negotiated for a group of transactions. In another example, the negotiated spread is based on parameters including LIBOR plus.

For purposes of this invention, the market maker means the bank or other financial institution that sets currency exchange rates.

For purposes of this invention, the offset rate is the rate at which the market maker will book the rate for the currency conversion and includes the interbank market indicator. In one example, the offset rate is based on at least the type of currency to buy or sell, the amount of currency to buy or sell, and the type of currency for conversion.

For the purposes of this invention, real-time means at or about the very time it occurs.

In this embodiment, the computer system receives a plurality of inputs. Suitable inputs include but are not limited to account number, customer name, type of currency to buy or sell, amount of currency to buy or sell, type of currency for conversion, and the negotiated spread. At the time that a currency conversion transaction is initiated, the computer system receives, for example, the offset rate in real-time. The computer system then calculates, for example, the customer dealt rate by adding the negotiated spread to the offset rate. In one example, the computer system calculates the customer dealt rate in real-time. In this embodiment, the computer system calculates the amount of currency for exchange based on the offset rate and the customer dealt rate. At this stage when an amount of currency for exchange is calculated, the computer system assigns a reference value to the transaction and captures the date and time. In one example, the reference value is a reference number. In calculating the amount of currency for exchange, the computer system determines, for example, the market cost by subtracting the offset rate from the customer dealt rate and calculating the value of the difference in a currency relevant to the customer (i.e. U.S. Dollars for a customer located in the United States of America). Finally, in one example, the computer system generates a point of conversion ("POC") report, at the same time that the amount of currency for exchange is calculated, which includes the offset rate and customer dealt rate. In another example, the POC report is generated at or about the same time that the customer agrees with the pricing of the transaction, including the negotiated rate. Additional suitable outputs of the computer system that may appear on the point of conversion report include but are not limited to customer name and number, date and precise time of execution (for example, to the second or smaller time increment), reference number, bought amount, currency bought, sold amount, currency sold, and market delivery cost.

In one example, immediately after the POC report is generated, it is transmitted to the customer. In another example, the POC report is stored, and after a series of transactions the stored POC reports are compiled and then transmitted to the customer in a summary form. In a further example, the POC report is stored and after a period of time the stored POC reports are transmitted to the customer.

In one embodiment, the point of conversion system includes services and options on such as:

Document Center: Allows a client to review and search documents

My Profile and Tools: Allows a client to set Preference, change Username/Password, view Settlement Accounts and see any messages with the Message Center.

Figure 4:
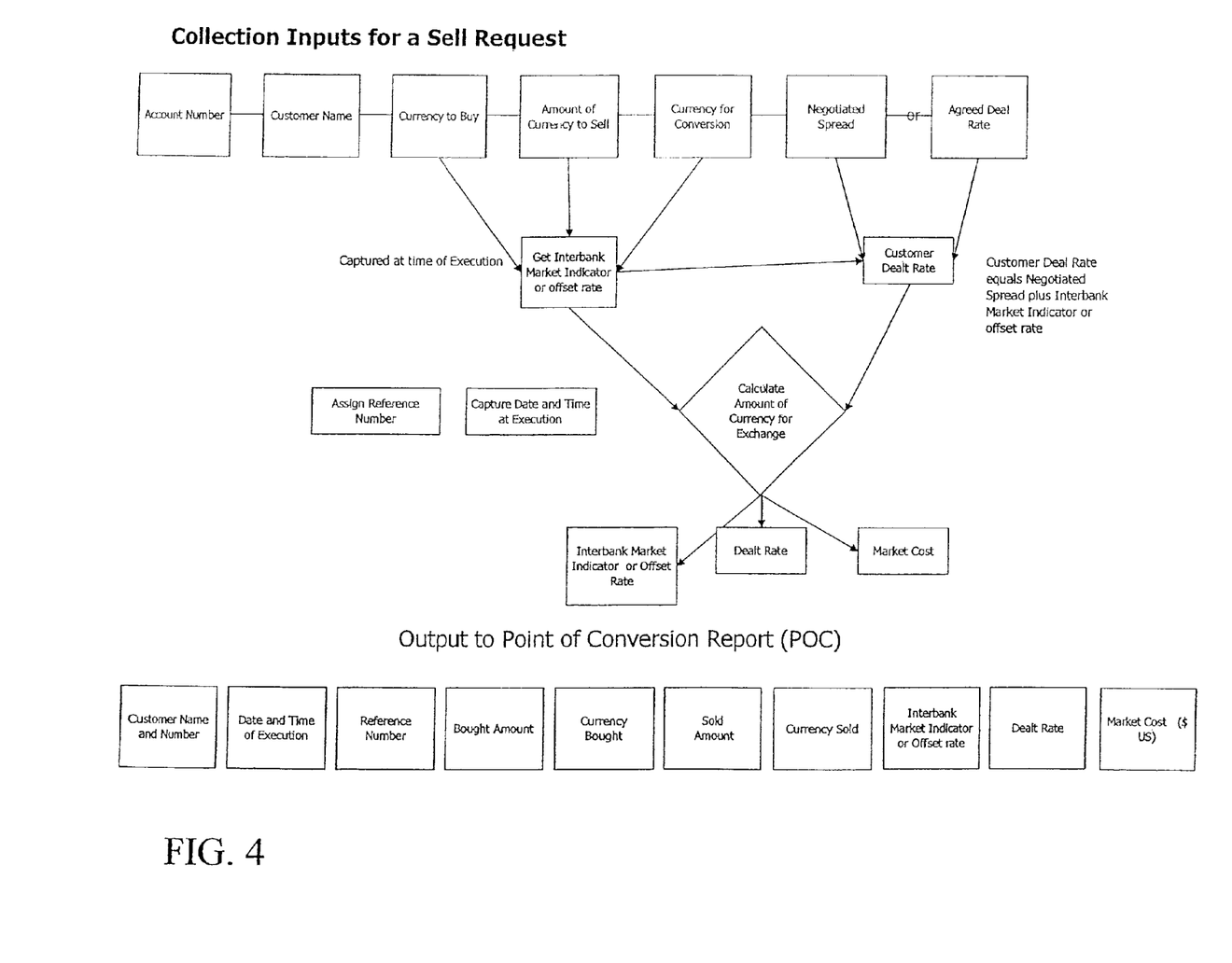
FIG. 4 depicts a flow chart of an embodiment of the point of conversion system, which shows an example of compiling a point of conversion analysis, wherein the customer seeks to sell currency.

FIG. 4 depicts a flow chart of an embodiment of the point of conversion system, which shows an example of compiling a point of conversion analysis, wherein the customer seeks to sell currency.

Figure 5:
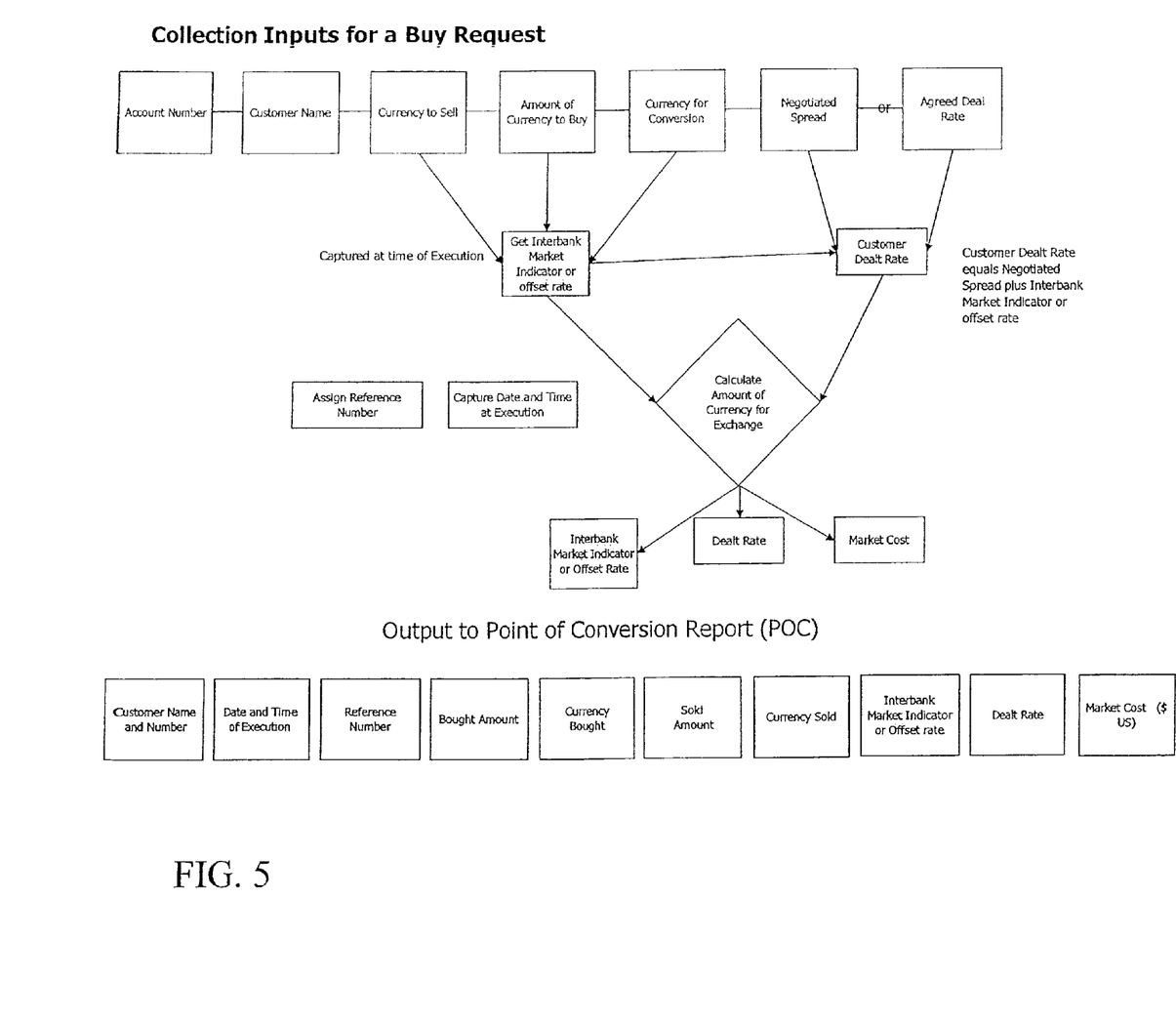
FIG. 5 depicts a flow chart of an embodiment of the point of conversion system, which shows an example of compiling a point of conversion analysis, wherein the customer seeks to buy currency.

FIG. 5 depicts a flow chart of an embodiment of the point of conversion system, which shows an example of compiling a point of conversion analysis, wherein the customer seeks to buy currency.

Figure 6:
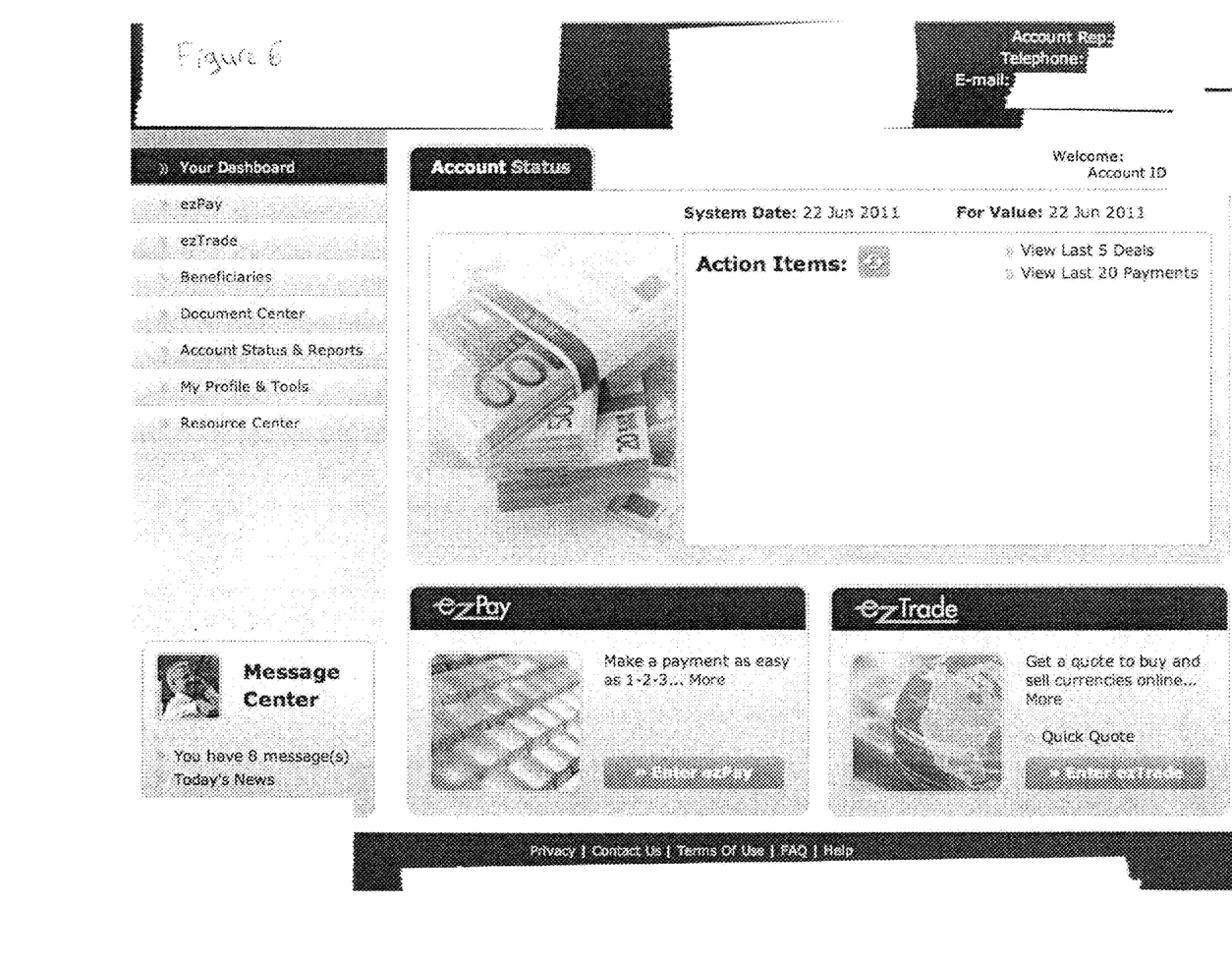
FIG. 6 depicts one example of a home screen presented to a user of an embodiment of the point of conversion system.

FIG. 6 depicts one example of a home screen presented to a user of an embodiment of the point of conversion system.

FIG. 7a-h depicts a series of example screenshots presented to a user of embodiments of the point of conversion system.

Figure 7A:
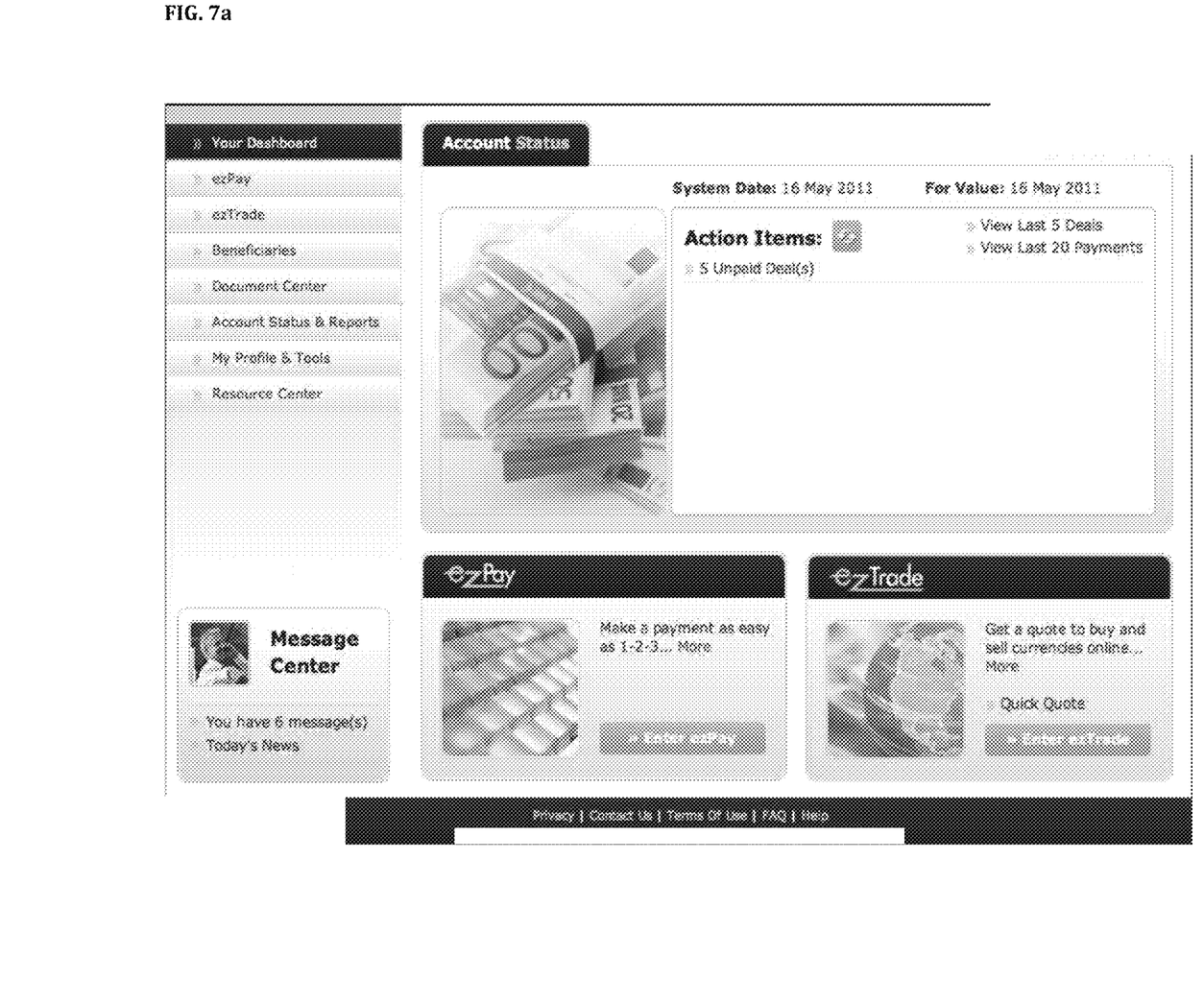
FIG. 7a-h depicts a series of example screenshots presented to a user of embodiments of the point of conversion system.

FIG. 7a is screenshot of an example of the first page of one embodiment of an online point of conversion system, which is known as the "Dashboard." This is the main area of navigation for a client. From here clients can access any necessary items along with titles and links to each of the main pages.

Figure 7B:
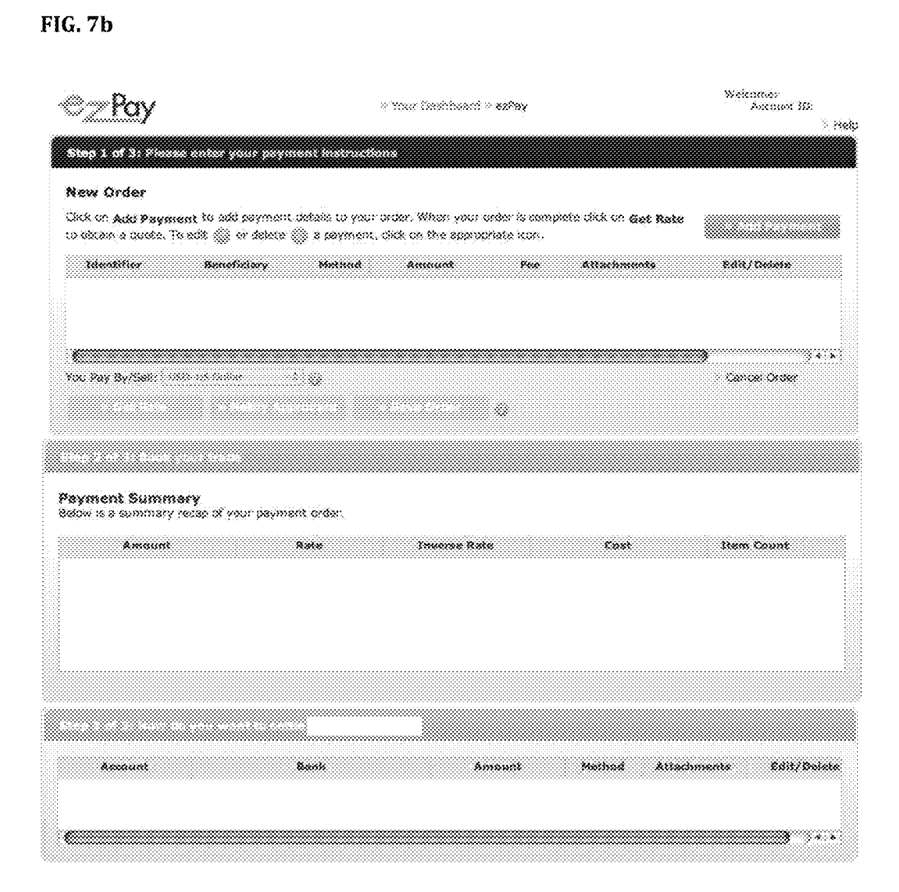

FIG. 7b is a screenshot of an example of a section of an embodiment of the point of conversion system site that gives clients the ability to make a payment to a third party and transact the exchange simultaneously. This "ezPay" section consists of three steps that allow clients to easily move from New Orders to Payment Summary and how they would like to settle out their accounts. Some highlights of "ezPay" include:

Identify payments first to streamline payment process

Lock in a rate for all payments against a single currency

Set up beneficiary and settlement accounts to instantly apply payment

Use the Beneficiary Lookup tool to search and select beneficiary details

Figure 7C:
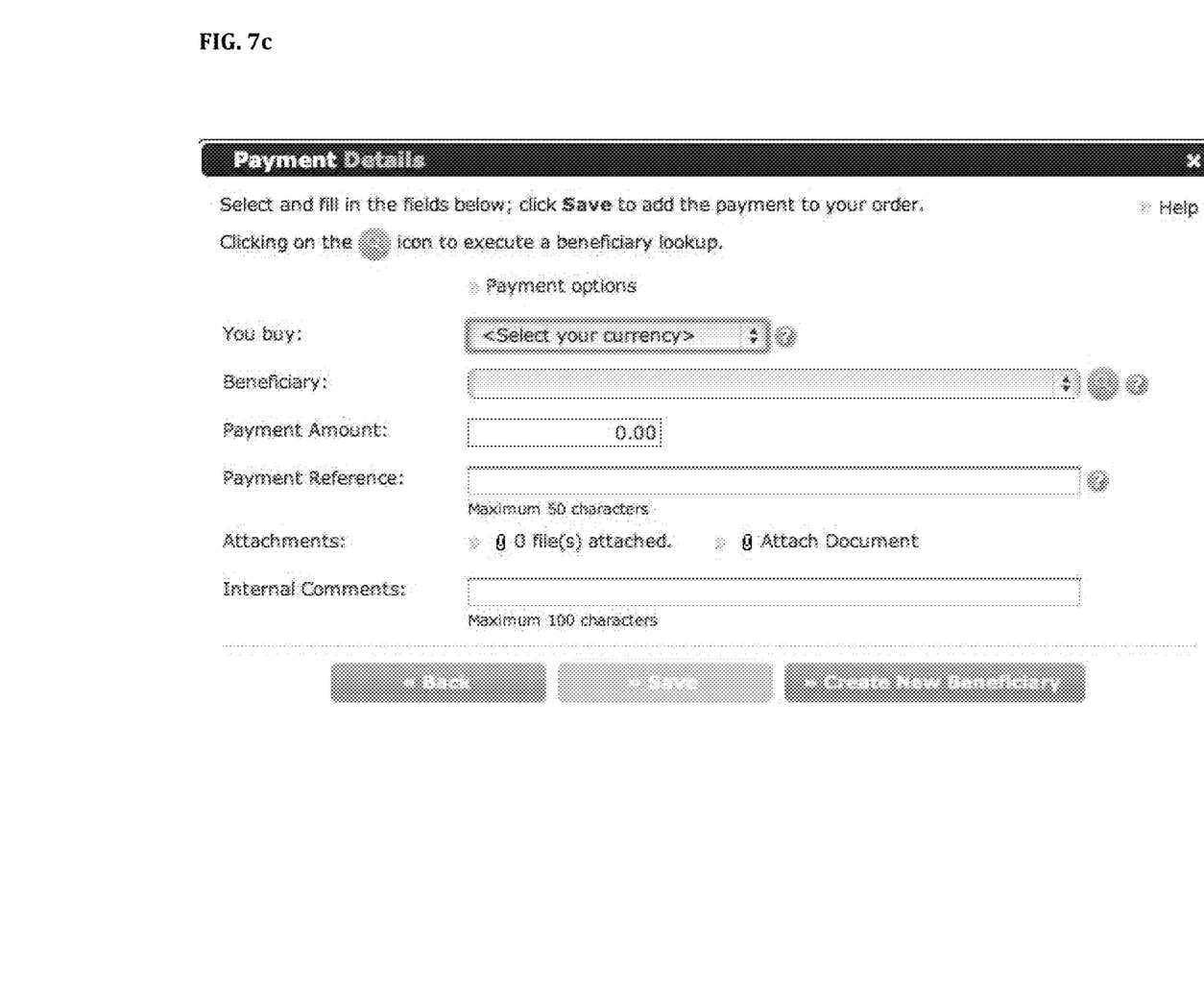

Depending on a client's requirements, use the dual approval process to approve deals View, print or export transaction details for review FIG. 7c is a screenshot of an example of an "ezPay Payment Details" screenshot from one embodiment of the point of conversion system.

Figure 7D:
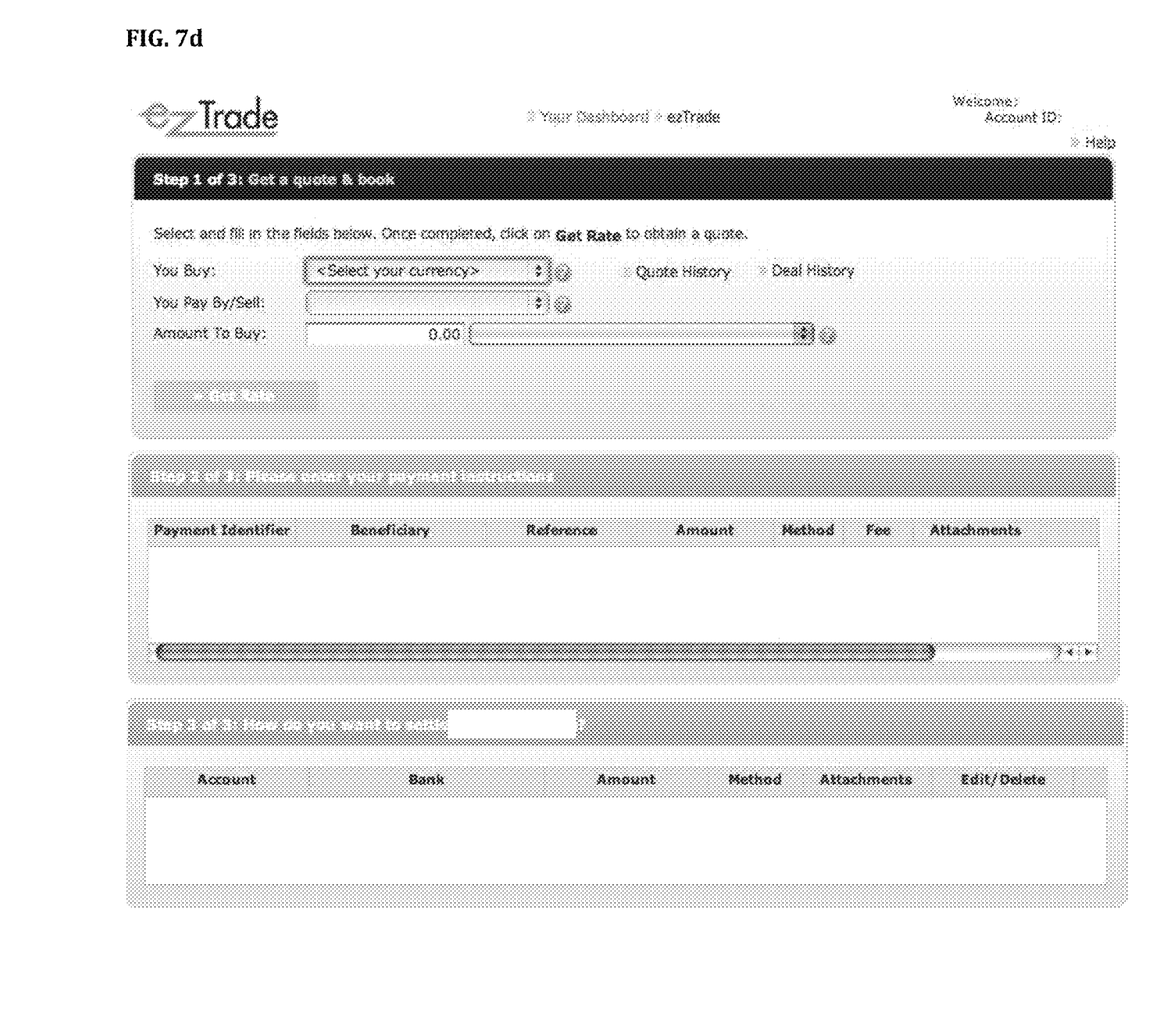
Figure 7E:
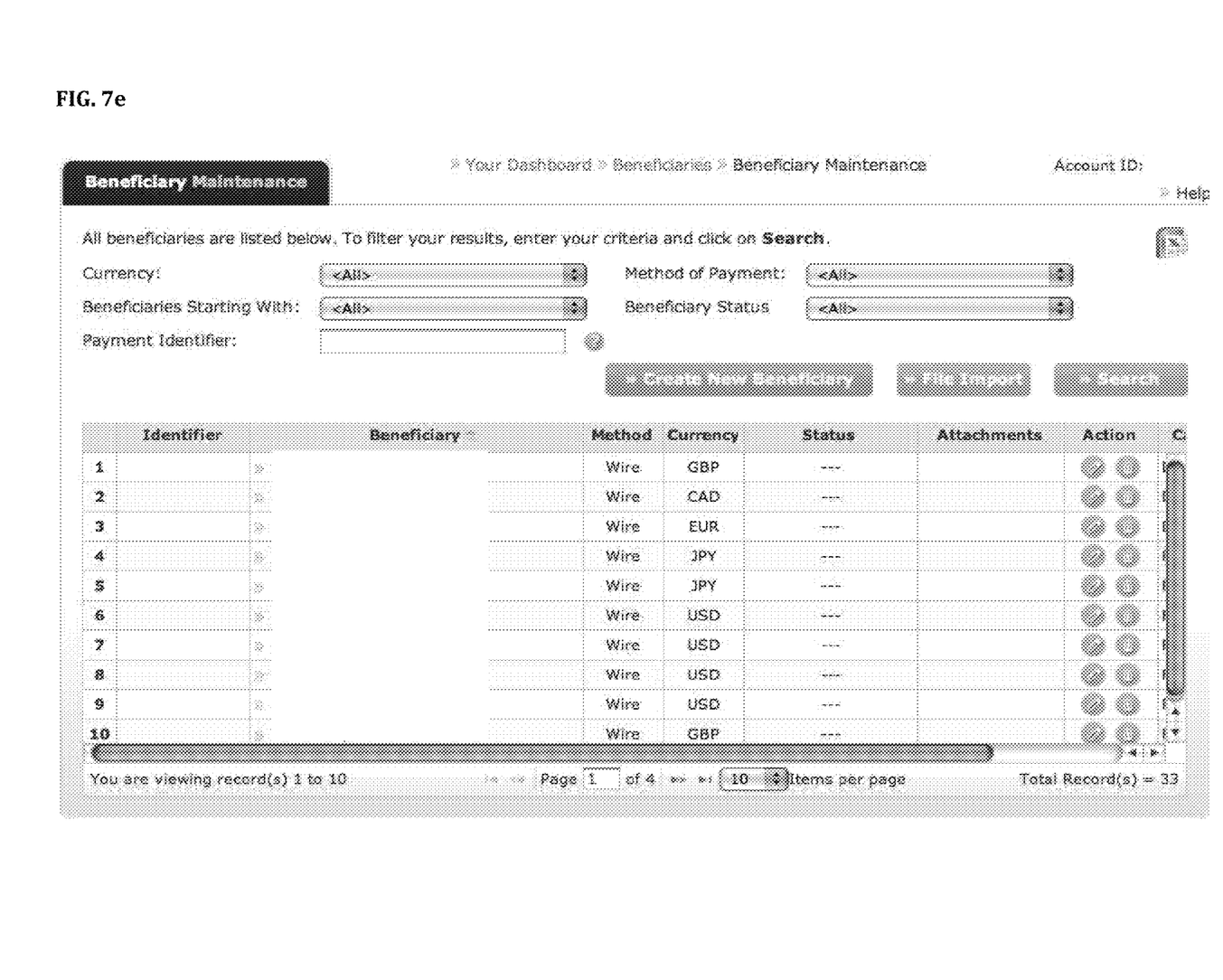
Figure 7F:
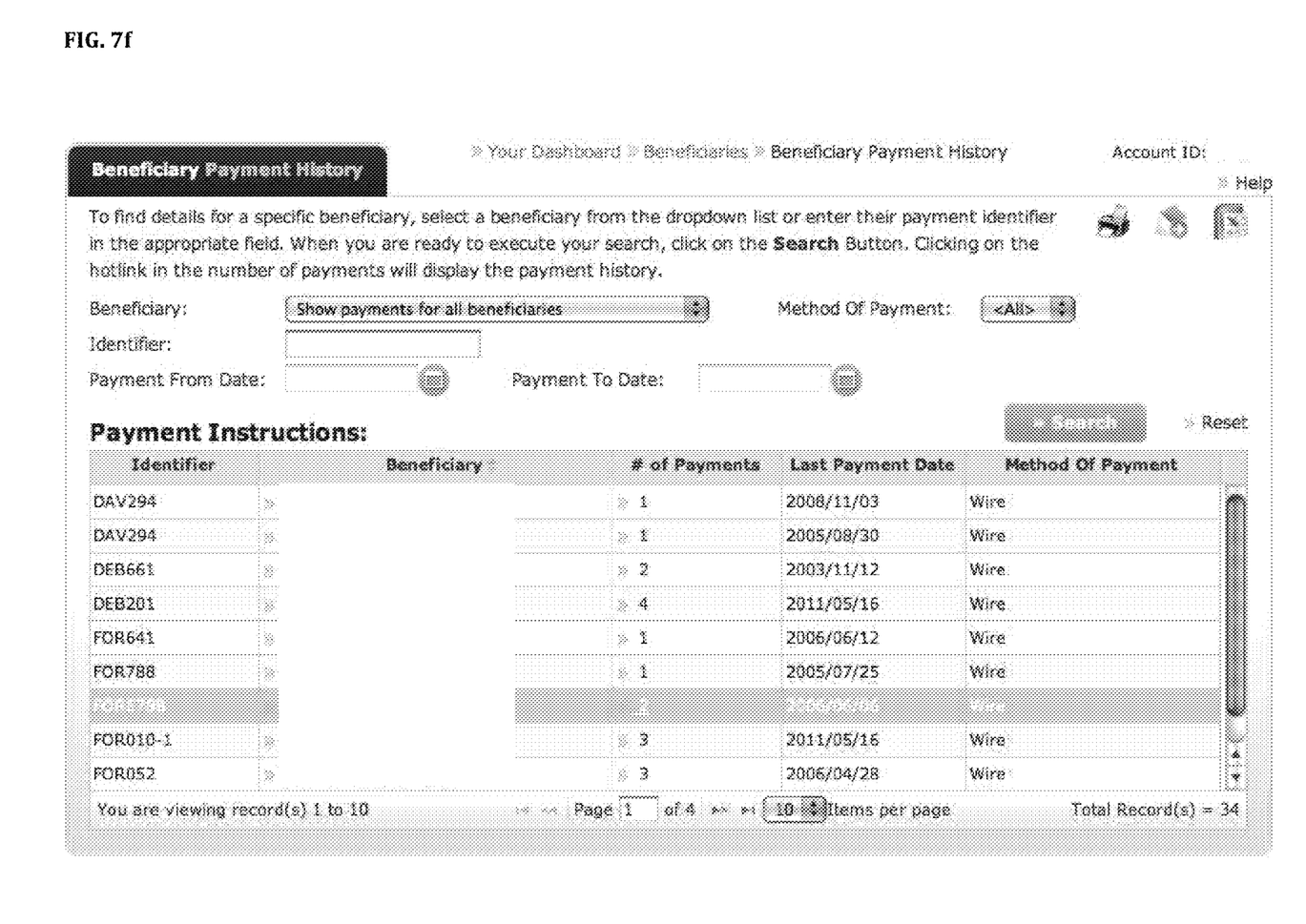

FIG. 7d is a screenshot of an example of a section of an embodiment of the point of conversion system site designed to assist clients to complete spot transactions for cross currency trades. This "ezTrade" section allows a client to book the rate first and apply payment instructions later. This section consists of three steps where a client can get a quote and book a deal, send payments to a beneficiary and settle the funds. Some highlights of "ezTrade" include:

Lock in rate first and then add payment instructions at the client's convenience Access previous order and quote history for new deals Set up beneficiary and settlement accounts to instantly apply payment Use the Beneficiary Lookup tool to search and select beneficiary details View, print or export transaction details for review FIGS. 7e-f relate to an example of a section of an embodiment of the point of conversion system site designed to help clients managed their client base. These "Beneficiaries" tools allow a client to do the following:

Add new beneficiaries with 'Beneficiary Maintenance', as clients continue to create a list of beneficiaries they will have the ability to search, review and edit these details.

'Payment Groups' help the client to identify and organize a series of similar payments to be released at the time of payment, keeping the client organized and saving them time from reviewing a long list of payees.

Some highlights of the "Payment Groups" feature include:

Group like payments to be released at the same time

Review and sort through list of payees with similar payments

Keep groups up-to-date at the client's convenience by easily adding or editing groups or payments.

Some highlights of the Beneficiaries Section include "Beneficiary Maintenance:"

Use templates for an easy and organized way of editing or entering new beneficiary details Send automatic alerts to a beneficiary via email each time payment is released Select the method of payment, either fast or slow to fit the client's needs Locate a bank using the banking directory Create searches to filter through beneficiaries or export as a customized report Review a beneficiary at-a-glance or expand for complete details FIG. 7e is a screenshot of an example of the "Beneficiary Maintenance" section.

In one embodiment, the "Beneficiaries" section also includes "Beneficiary Payment History." Some highlights of this section include:

Quickly review payment history for each beneficiary

Monitor and investigate the number of individual payments released with detailed search capabilities FIG. 7f is a screenshot of an example of the "Beneficiary Payment History" section.

Figure 7G:
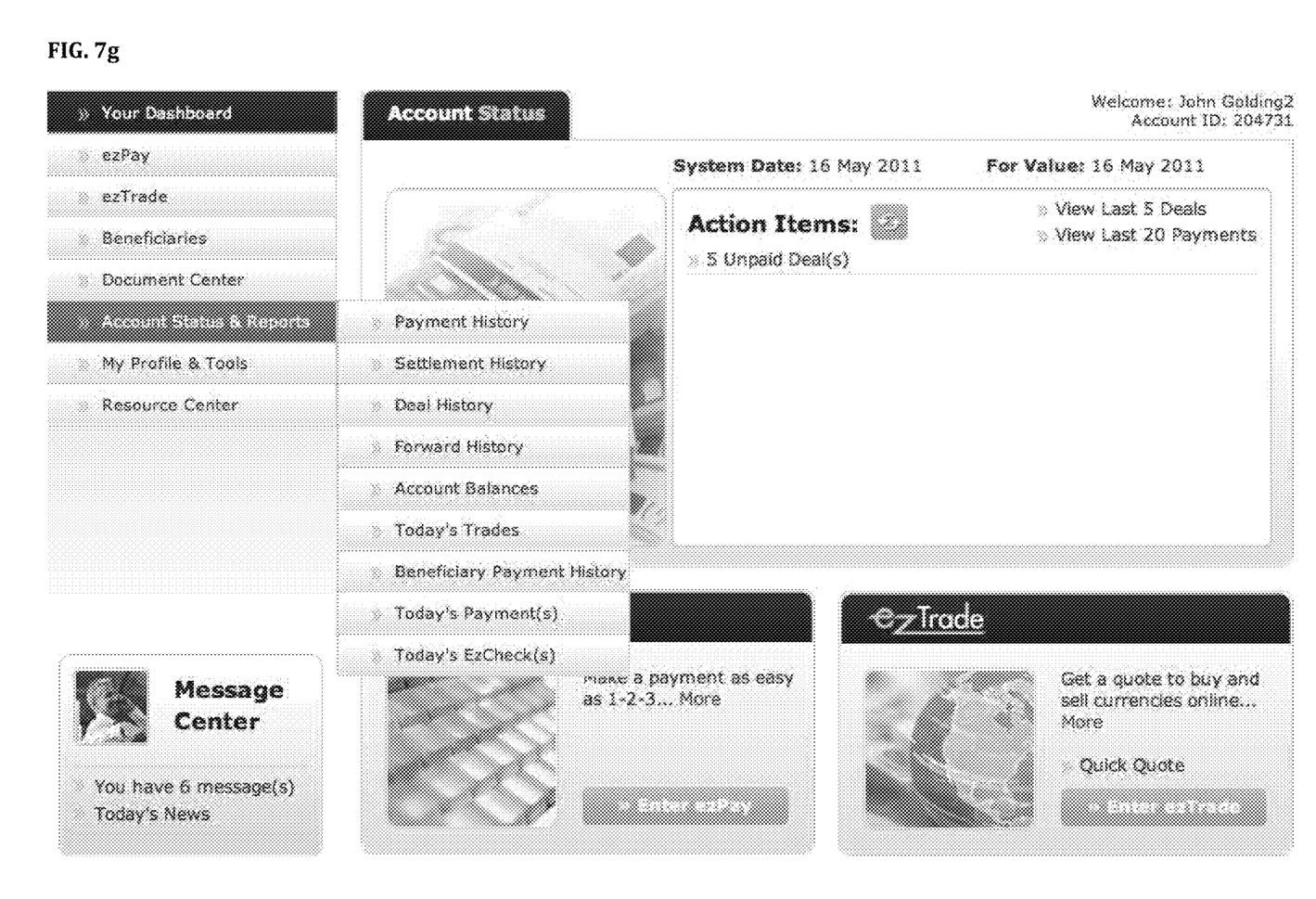

FIG. 7g is a screenshot of an example of an "Account Status Dropdown" section of the "Dashboard" of an embodiment of the point of conversion system site. In this embodiment, a record of each deal a client creates is recorded in the system's database. With the search criteria available in 'Account Status & Reports' a client can review all account activity and create corresponding reports anytime they require the information. By accessing the following categories from the drop down menus, which include, 'Payment History', 'Settlement History', 'Deal History', 'Forward History', 'Account Balances' and 'Today's Trades', a client can select the activities that will assist them in sorting and organizing key information. For each search a client can add as much or as little information as they prefer, the more detail they provide gives them the opportunity to create customized reports for themselves and their team. These results are immediately displayed for the client's review or use the icons to print or export the results to a spreadsheet file (such as Microsoft® Excel) which can then be used with their own accounting software.

Figure 7H:
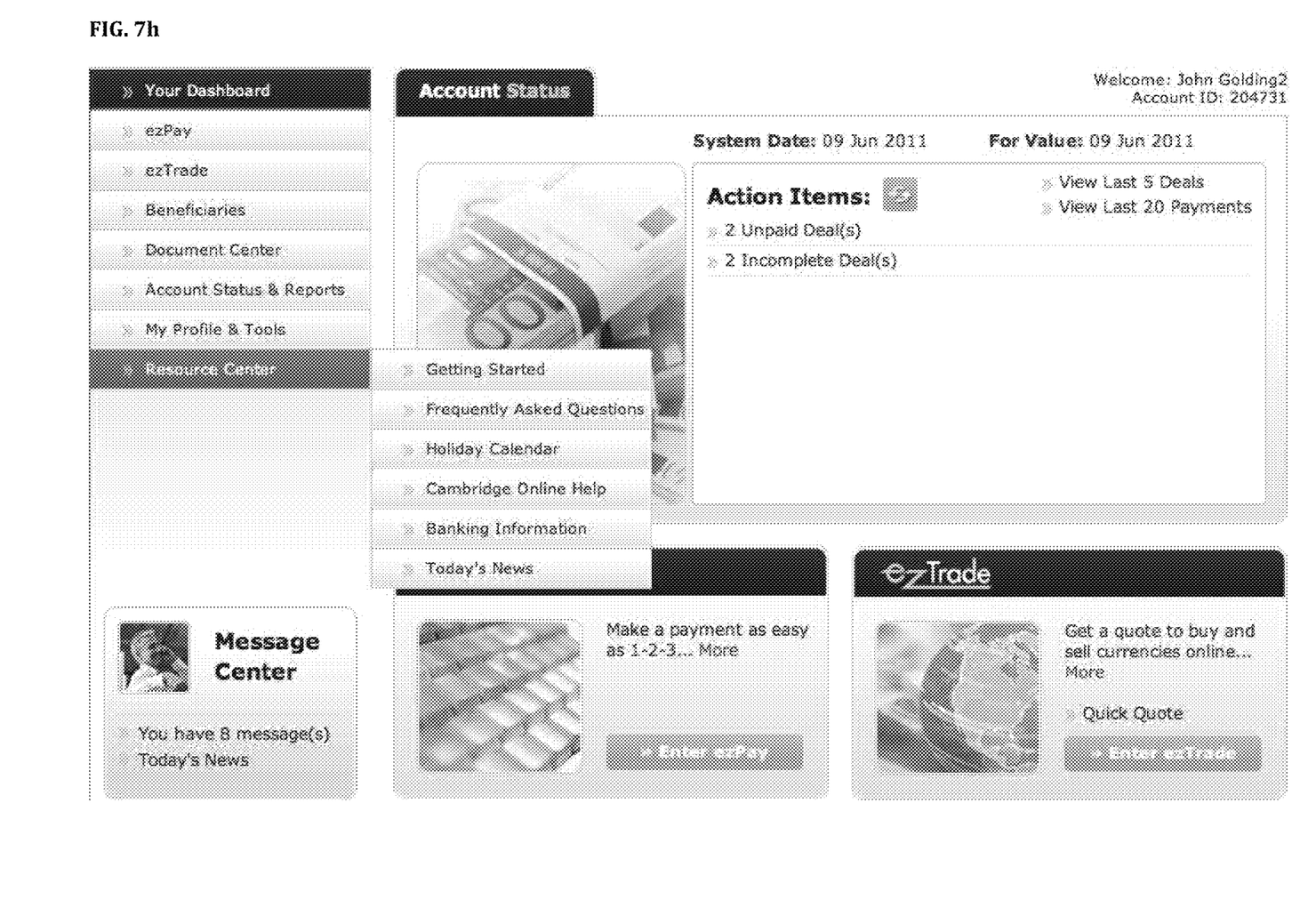

Some highlights of the "Account Status Dropdown" include:

Search and view historical account activity for all your accounts by a specific date range, deal, reference ID or beneficiary Select and download account history which you export to a spreadsheet file (such as Microsoft® Excel) or print FIG. 7h is a screenshot of an example of a "Resource Center Dropdown Menu" from the "Dashboard" of an embodiment of the point of conversion system site.

Figure 8:
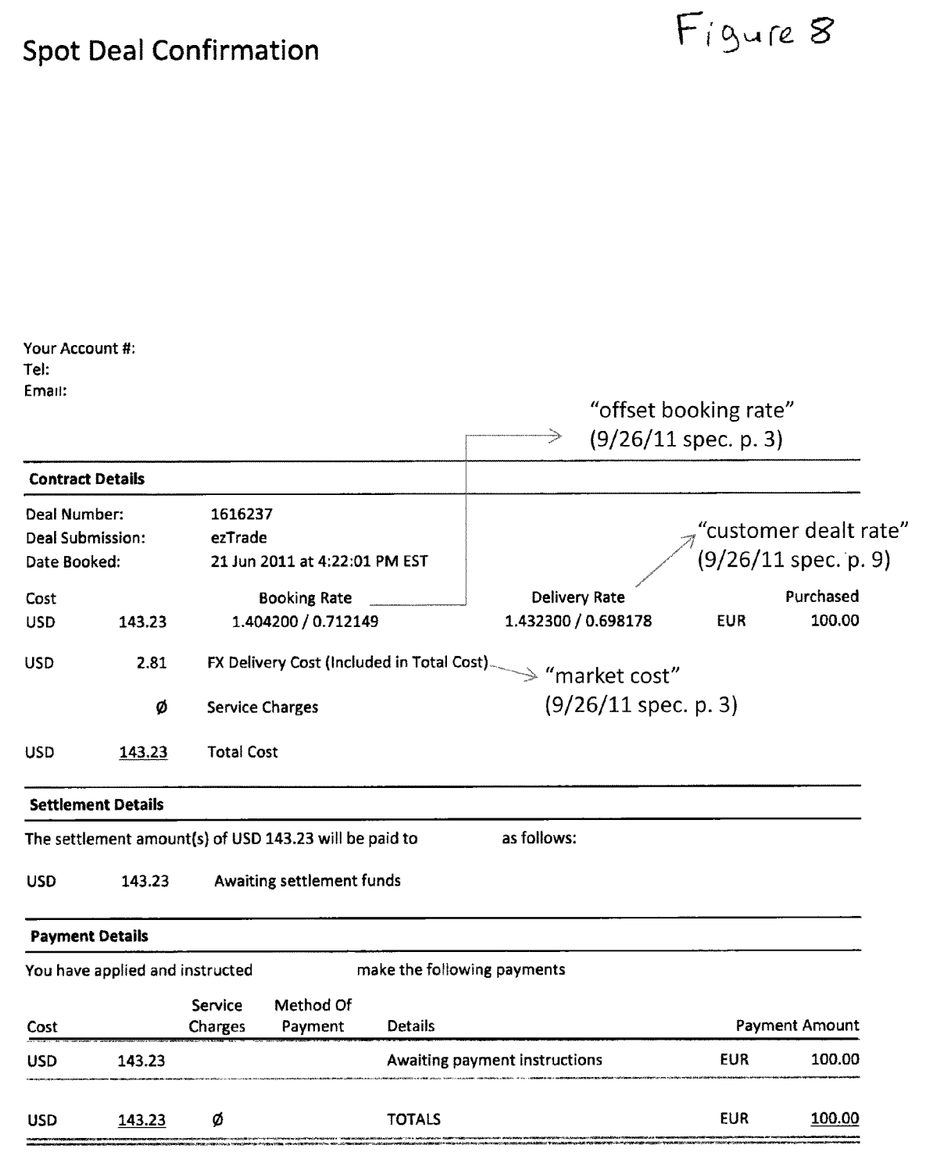
FIG. 8 depicts an example of a POC report.

FIG. 8 depicts an example of a POC report.

The invention claimed is:

1. A computer-implemented method for point of conversion analysis, the method comprising:
  (a) providing, by a computer system, a plurality of pre-programmed components,
    wherein the plurality of pre-programmed components comprising at least one pre-programmed software component from each of the following types of pre-programmed components:
    (i) at least one time series component, and
    (ii) at least one conversion component;
  (b) retrieving data by the computing system from a plurality of data sources for one specific transaction including currency to buy or sell, amount of currency to buy or sell, type of currency for conversion, a negotiated spread or agreed deal rate, and a booking rate,
    wherein the booking rate is a rate at which the market maker will book the rate for the conversion in real-time with one or more conversion transactions,
    wherein the market maker is an individual or entity that sets a currency exchange rate, and
    wherein the booking rate includes an interbank market indicator;
  (c) storing the data in at least one data structure using a computing system;
  (d) compiling a point of conversion analysis based on the data by a computing system including calculating:
    (i) a delivery cost,
    (ii) a delivery rate,
    (iii) an amount of currency to be bought or sold;
    wherein the delivery cost is a value of a difference, calculated in a currency required by the customer, between the market maker's booking rate and the customer's delivery rate in a specific market in which the conversion is taking place,
    wherein the customer's delivery rate is the sum of the negotiated spread and the booking rate; and
  (e) displaying by a computing system to a customer a point of conversion report;
    wherein, the point of conversion report includes at least:
    (i) the delivery cost,
    (ii) the delivery rate,
    (iii) the booking rate,
    (iv) the amount of currency bought or sold; and
    (v) a time that the booking rate is booked,
      wherein the time is reported in hours, minutes, and seconds.

2. The method of claim 1 wherein a computing system includes one or more programmed computers.

3. The method of claim 1 wherein a computing system is distributed over a plurality of programmed computers.

4. The method of claim 1 wherein at least one data structure is one or more databases.

5. The method of claim 1 wherein the point of conversion report is displayed to the customer immediately after the point of conversion analysis is compiled.

6. The method of claim 1 or 5 wherein the point of conversion report is stored by a computing system and displayed to the customer after a series of conversion transactions is completed, wherein a point of conversion report is generated by a computing system for each conversion transaction.

7. The method of claim 1 wherein the point of conversion analysis is performed in real-time.

* * * * *